Nov. 11, 1969 J. P. PRITCHARD, JR 3,477,848

METHOD FOR PRODUCING SETS OF PHOTOMASK HAVING ACCURATE REGISTRATION

Filed Dec. 14, 1964 4 Sheets-Sheet 1

INVENTOR
JOHN P. PRITCHARD, JR.

E. Mickey Hubbard

ATTORNEY

INVENTOR
JOHN P. PRITCHARD, JR.
E. Mickey Hubbard
ATTORNEY

INVENTOR
JOHN P. PRITCHARD, JR.
E. Mickey Hubbard
ATTORNEY

INVENTOR
JOHN P. PRITCHARD, JR.
E. Mickey Hubbard
ATTORNEY 3,477,848

METHOD FOR PRODUCING SETS OF PHOTOMASK HAVING ACCURATE REGISTRATION

John P. Pritchard, Jr., Richardson, Tex., assignor to Texas Instruments Incorporated, Dallas, Tex., a corporation of Delaware Filed Dec. 14, 1964, Ser. No. 418,232
Int. Cl. G03c 5/04
U.S. Cl. 96—27 1 Claim

ABSTRACT OF THE DISCLOSURE

This specification discloses a process for producing a set of photomasks for fabricating a multi-layer circuit having a plurality of component areas, at least one of which is repeated, disposed at predetermined relative positions within the circuit, characterized by the steps of:

(a) producing a basic pattern for each photomask, each basic pattern including all the different component areas in the circuit, the different component areas being oriented in order of occurrence in the circuit in both the transverse and the longitudinal directions with all repetitive component areas in both of the directions omitted;

(b) producing a first reticle including each of the basic patterns, the basic patterns being rigidly interconnected at spaced positions;

(c) moving a first photographic plate relative to the first reticle in the transverse direction to successively align each component area with the appropriate relative position on the first photographic plate;

(d) exposing the photographic plate through the appropriate component areas of each basic pattern at each of the successive transverse positions;

(e) developing the first photographic plate to produce a second reticle having an intermediate pattern for each photomask at rigidly interconnected, spaced positions, each intermediate pattern including all component areas of the circuit in the transverse direction and eliminating all repetitive component areas in the longitudinal direction;

(f) moving a second photographic plate relative to the second reticle in the longitudinal direction to successively align each transverse set of component areas of the intermediate patterns with the appropriate relative longitudinal position on the second photographic plate;

(g) exposing the second photographic plate through the appropriate component areas of each of the intermediate patterns at each of the successive longitudinal positions; and (h) developing the second photographic plate to produce the set of photomasks whereby corresponding component areas of all the photomasks will have corresponding positional errors and will be precisely registrable.

This invention relates generally to integrated microcircuits, and more particularly, but not by way of limitation, relates to a process for the generation of a set of photomasks required for the fabrication of very small, multilayer integrated circuits such as cryotron associative memory arrays.

The fabrication of integrated circuits generally comprises a series of steps wherein a light-sensitive material, referred to as photo-resist in the art, is applied over the surface of a material to be selectively etched, such as a metallic layer or insulating layer on a substrate. The photo-resist is then exposed in predetermined areas by projecting light through a photomask film, and then developed to remove the photo-resist film in predetermined areas and thereby expose the underlying layer. The substrate is then immersed in an etchant to remove or otherwise modify the exposed areas of the underlying layer. The underlying layer of oxide film may serve as a diffusion mask through which impurities are diffused into a semiconductor crystal substrate to form various active regional semiconductor components, or serve as an electrical insulating layer. The metal films may be patterned to form the electrical conductors interconnecting various components of the circuit, for example.

In copending U.S. application Ser. No. 339,018, filed Jan. 20, 1964, by Pierce and Pritchard, now U. S. Patent No. 3,366,519, entitled "Process For Manufacturing Multilayer Film Circuits," and assigned to the assignee of this invention, a process for fabricating cryotrons was described. In general, the cryotrons are formed by first depositing a thin tin (Sn) film over a substrate. A layer of photo-resist is then applied over the tin film, exposed through a photomask, and developed to expose the tin (Sn) in certain areas. The tin (Sn) is then etched away in the exposed areas to leave control gate strips, and the remaining photo-resist is stripped away. A new layer of photo-resist is applied over the substrate, exposed through a photomask and developed to form tab-through windows over the ends of the tin (Sn) gate strips, a thin lead (Pb) film is then formed over the layer of photo-resist and a third coat of photo-resist applied over the lead (Pb) film, exposed through a mask, and developed to remove the photo-resist film and expose the lead (Pb) in predetermined areas. The substrate is then immersed in an etchant to remove the exposed areas of the lead (Pb) and form the conductors of the cryotron. Thus it will be noted that for the simplest construction of the cryotron, three separate photomasks are required.

One very important application of cryotron circuits is in the construction of associative memory systems. Such a memory system uses a vast number of memory cells divided into memory words. It is highly desirable to place a very large number of memory cells in an array on a single planar substrate so as to minimize the problems associated with interconnecting successive arrays with superconductive junctions. In such an array, each memory cell comprises a number of cryotrons with interconnecting conductors. The memory cells might be arranged to form sixty words, for example, with each word containing as many as ninety-six memory cells. Thus a total of over 5,000 memory cells, each containing a number of cryotrons, and the associated circuitry might be placed on a single substrate four by four inches square.

The cryotron associative memory arrays and most thin film integrated circuits in general, have a large number of identical structures which are interconnected by relatively simple metallic strip lines. This is particularly true of the cryotron associative memory arrays wherein a very large number of identical memory cells are interconnected by simple strip-line conductors. Therefore, each of the many photomask patterns required to fabricate the cells, nine being required for one cell construction, is a composite of subpatterns repeated many times. One skilled in the art of photomask preparation will recognize that in addition to achieving adequate optical transmission quality, each photomask of the set, must be in precise registry or alignment so that successively formed layers will be in proper overlying relationship to form the desired active components. Thus the various structural elements from the separate material layers must be oriented within some prescribed dimensional tolerance which will, in general, be a small fraction of the minimum dimension of the smallest pattern element, such as a line width, area opening in a photo-resist insulation layer or the like. Since it is desired to have minimum line widths on the order of 1.0 mil, the elements from successively deposited and patterned layers must often be positioned with a tolerance on the order of 0.1 to 0.05 mil, and the smaller the tolerance which can be attained, the smaller the components can be made and the more closely the components can be spaced.

The conventional technique for producing a set of photomask patterns is to merely produce the entire pattern for each photomask on a magnified scale using some conventional artwork technique. For example, the opaque patterns can be formed from strips of Studnite placed on a transparent backing and subsequently reduced by photographic techniques to actual size so that the photomask can be placed in direct contact with the substrate and the photo-resist exposed by essentially a contact printing technique. In a relatively large, dense array of minute elements, this procedure is impractical because of the very large size required of the original artwork in order to achieve the desired accuracy of line geometry. An alternative approach for producing photomasks recently available involves exposing the entire pattern for each photomask by illuminating a photographic plate with a precisely controlled moving spot of light. This technique requires the use of a very expensive and precise mechanism.

Another conventional method used for producing sets of photomasks entails producing simplified patterns containing each of the repetitive units of the particular photomask on an enlarged scale by means of Studnite cut-and-strip techniques or other conventional artwork techniques. Each photomask is then formed by positioning the pattern of each repetitive unit in its appropriate position over a photographic plate, then exposing the photographic plate through the pattern while protecting the remainder of the plate from exposure. The pattern is then indexed to the next adjacent position and the exposure repeated. This step-and-expose process is continued until all portions of the plate have been exposed. The plate is then developed to produce the completed photomask. This procedure is repeated for each photomask of the set.

The latter approach overcomes the objection of requiring a prohibitive amount of initial artwork or expensive apparatus, but imposes severe constraints on the mechanism for transporting the simplified pattern through the step-and-expose process for each photomask. In other words, the mechanism for moving the simplified pattern relative to the photographic plate must be able to return to any predetermined point over the area of the final photomask with such a small allowable error as to make the equipment required prohibitively expensive because of the resulting positional error at each point, as well as the cumulative error resulting from the many successive positions.

It is an important object of the present invention to provide a process for producing a set of photomasks for use in fabricating circuits of the type described wherein the registration between the components of each photomask with the corresponding components of the other photomasks of the set can be very closely controlled.

Another object of the invention is to provide such a process which requires relatively inexpensive equipment having relatively large positioning tolerances.

A further object of the present invention is to provide a process by which highly repetitive photomasks can be produced on a more economical basis.

These and other objects are accomplished by first producing a basic pattern for each of the individual component areas of each of the photomasks on rigidly interconnected, light transmitting plates to form a single reticle, then moving the reticle with respect to a corresponding number of rigidly interconnected photosensitive plates while simultaneously exposing the corresponding component areas of the interconnected photosensitive plates to simultaneously produce all of the photomasks. This process insures that any errors made in positioning the patterns for each component area will be precisely duplicated in each of the separate photomasks so that the several photomasks will have precise registration within each corresponding component area.

In accordance with another aspect of the invention, the basic patterns for the separate repetitive component areas which are carried by the reticle each comprises the peripheral component areas of the final circuit with all repetitive component areas in both the longitudinal and transverse dimensions eliminated. The reticle is then stepped and repeat-exposed in one direction relative to a photographic plate to expose all the component areas in that direction for all of the photomasks of the set. The plate is then developed to form an intermediate reticle which is then stepped and repeat-exposed in the other direction to expose the final pattern for each of the photomasks of the set on a single plate.

Additional aspects, objects and advantages of the invention will be evident to those skilled in the art from the following detailed description and accompanying drawings wherein.

Figure 1:
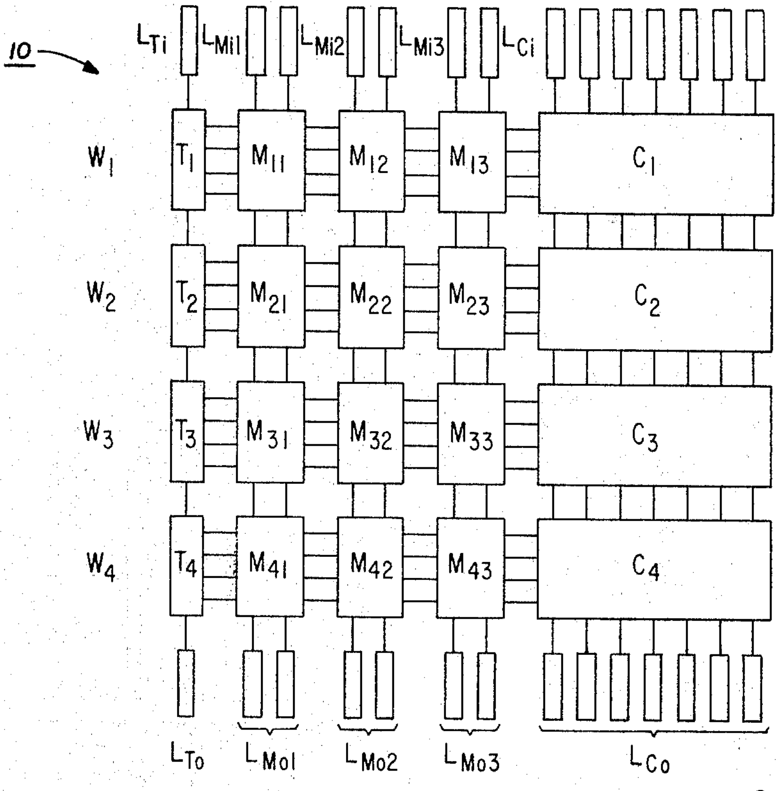
FIGURE 1 is a highly schematic illustration of a simplified cryogenic associative memory array which serves to illustrate the process of the present invention.

Referring now to the drawings, and in particular to FIGURE 1, a typical cryotron associative memory circuit is indicated generally by the reference numeral 10. The circuit 10 is comprised of a series of logic words, $W_1$, $W_2$, $W_3$ and $W_4$. In a typical array, there would customarily be as many as from 60 to 100 logic words $W_n$ on a single planar substrate. Each of the logic words W is comprised of three memory cells M and control circuits T and C. In actuality, each word would include as many as ninety-six memory cells M, and all of the logic words are identical. As illustrated, logic word $W_1$ includes memory cells $M_{11}$, $M_{12}$ and $M_{13}$ and control circuits $T_1$ and $C_1$. Each of the logic words $W_2$, $W_3$ and $W_4$ have corresponding memory cells and control circuits. Further, the strip line leads interconnecting each of the memory cells M and control circuits, i.e., the horizontal connection lines in FIGURE 1, are identical in number and position, as are the leads interconnecting the corresponding components of successive adjacent words, i.e., the vertical lead lines. A series of input and output terminals are also provided. For example, input terminal $L_{Ti}$ and output terminal $L_{To}$ are provided for the lead lines extending through word control circuits $T_1$–$T_4$. Similarly, input terminals $L_{Mi}$ and output contact terminals $L_{Mo}$ are provided for each of the vertical columns of memory cells, and inputs $L_{Ci}$ and outputs $L_{Co}$ are provided for the column of word control circuits C. Thus a number of arrays such as illustrated in FIGURE 1 may be interconnected into a single memory system merely by connecting the input and output terminals to the corresponding terminals on adjacent array.

Figure 2:
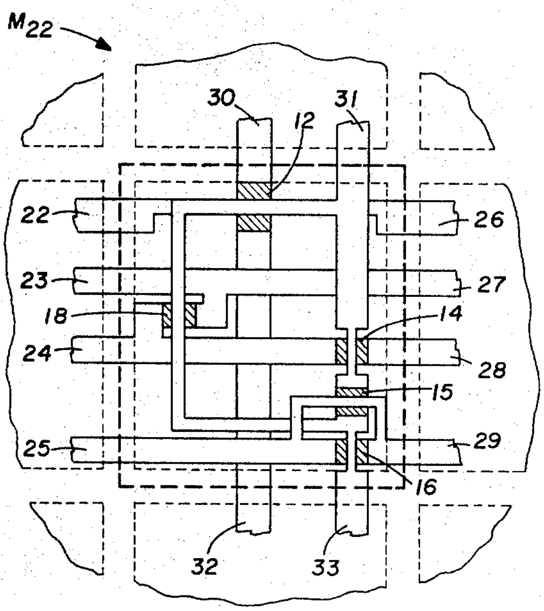
FIGURE 2 is a schematic drawing illustrating the details of one memory cell which might be used in the array of FIGURE 1.

A circuitry in a typical memory cell is illustrated schematically in FIGURE 2. The particular circuitry is of no consequence in the present invention and the cell $M_{22}$ is illustrated merely to assist in conveying a better understanding of the complexity of the circuit involved. As a matter of interest, cryotrons are illustrated at 12, 14, 15, 16 and 18. The four strip line leads 22–25 extend to the memory cell $M_{21}$, the strip line leads 26–29 extend to the memory cell $M_{23}$, the strip line leads 30 and 31 extend to the memory cell $M_{12}$, and the strip line leads 32 and 33 extend to the memory cell $M_{32}$. From this circuit it will be noted that a number of separate etching steps are required, each of which requires a photomask. In the circuit illustrated, nine separate photomasks are required. Each of the photomasks makes a particular contribution to each component area, a component area being considered for purposes of this disclosure as those areas which occur at least once, and those areas which are repeated within the overall circuit applied to a particular substrate. For example, the areas L, T, M and C are considered as component areas.

The important consideration in the present invention is that the contributions made by each of the nine photomasks within each component area register with great precision so as to permit smaller components and higher component density without jeopardizing the quality of the circuit. However, the interconnecting leads 22–33 do not require the same degree of precision and can be made oversized so as to accommodate greater errors in alignment yet still retain conductors of the minimum permissible width without significant sacrifice of total component density.

Figure 3:
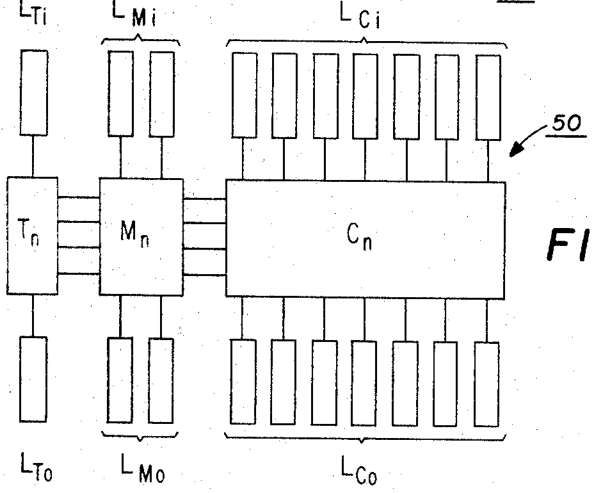
FIGURE 3 is a schematic illustration of a pattern used in the process of the present invention.
Figure 7:
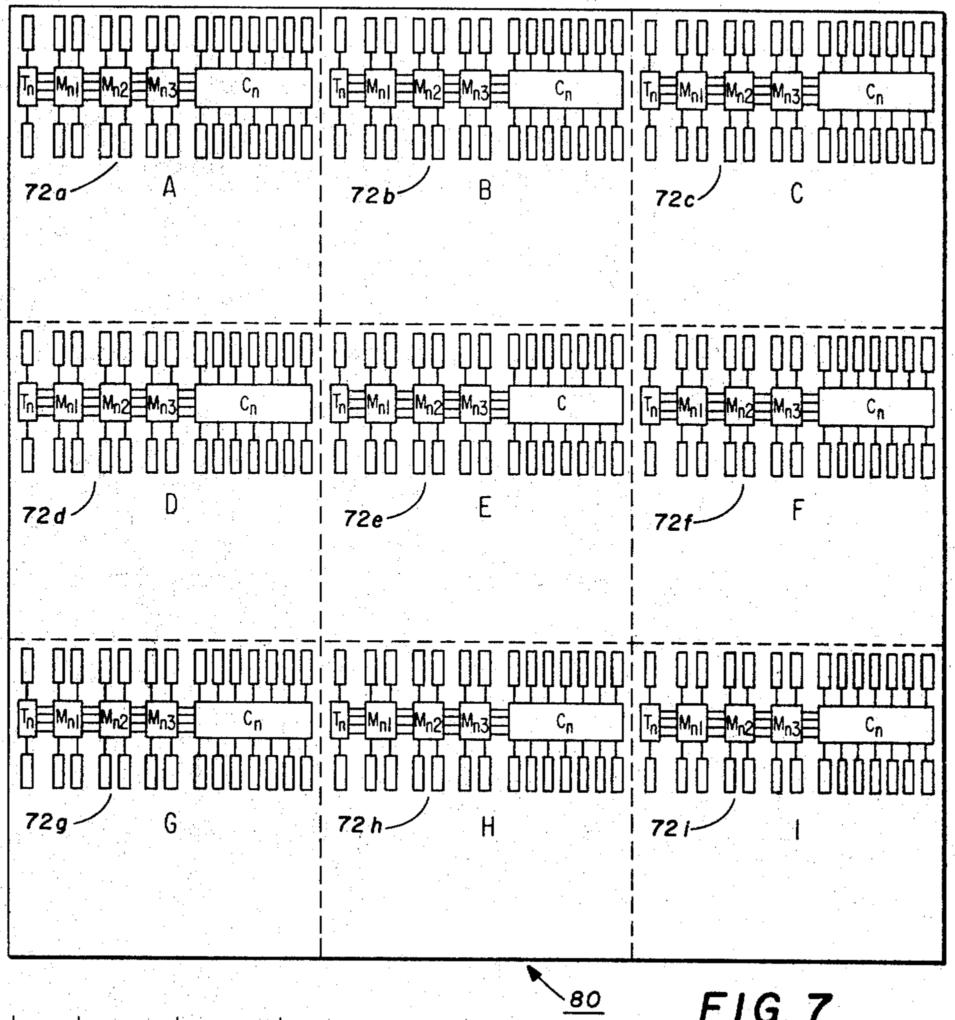
FIGURE 7 is a schematic representation of an intermediate reticle used in carrying out the process of the present invention.

Thus, in accordance with the present invention, a basic pattern 50 (see FIGURE 3) for each of the separate photomasks, nine photomasks will be referred to for purposes of illustration, is prepared. Each basic pattern 50 provides the contribution of that particular photomask in each of the different component areas. Such a basic pattern may be constructed using any conventional art technique. For example, the patterns for each of the photomasks may be originally formed on a sheet 40 inches by 40 inches by the so-called Studnite cut-and-strip technique which essentially involves cutting strips of opaque material and affixing the opaque material to a transparent sheet to form the desired patterns. Each of the basic patterns includes the same component areas arranged in the same relative position with maximum precision. In accordance with one specific aspect of the invention, the basic pattern for each photomask is comprised of all different component areas in both the transverse and longitudinal directions, with the second and all repeating component areas in both directions eliminated. Thus, for the circuit illustrated in FIGURE 1, each of the basic patterns for each of the photomasks is comprised of the contributions of that mask to component areas $L_{Ti}$, $L_{Mi}$, $L_{Ci}$, $T_n$, $M_n$, $C_n$, $L_{To}$, $L_{Mo}$ and $L_{Co}$. Thus it will be noted from a comparison of FIGURES 1 and 3 that in the vertical direction, all of words $W_1$, $W_2$ and $W_3$ have been eliminated and that in the horizontal direction $L_{Mi2}$, $L_{Mi3}$, $M_{12}$, $M_{13}$, $L_{Mo2}$ and $L_{Mo3}$ have been eliminated. Thus, every different component area of the circuit 10 is represented by the basic pattern 50, and all repetive component areas are represented only once. While the omission of the repeating component areas does not appear significant in the example illustrated, it will be recalled that from 60 to 100 words would actually be provided, each containing about ninety-four memory cells M.

Figure 4:
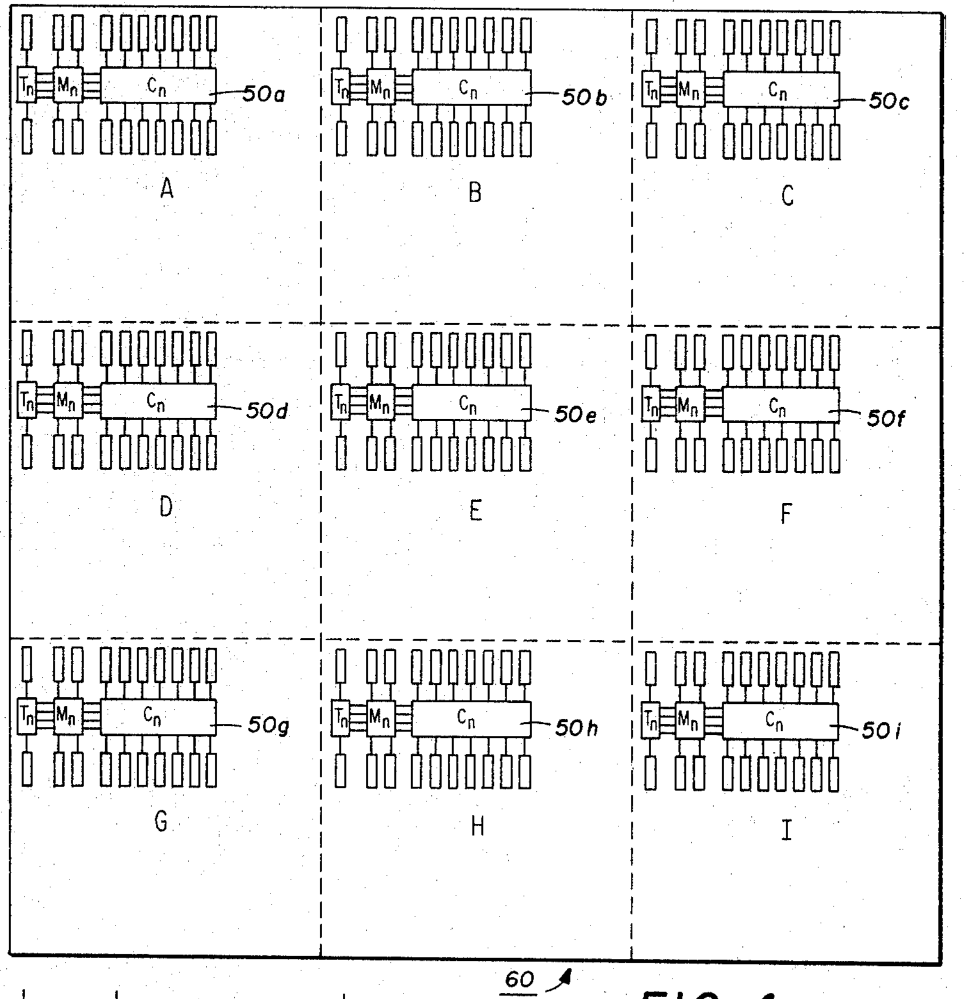
FIGURE 4 is a schematic representation of a reticle used in the process of the present invention.

As previously mentioned, a basic pattern for each of the nine photomasks containing the contribution of each particular photomask to the respective component areas are prepared. Next, the basic patterns **50*a*–50*i* for the nine photomasks are photographically reduced in size and printed on a transparent plate 60 as illustrated in FIGURE 4. The plate 60 is divided into nine areas A–I sufficiently large with relation to the size of the particular component areas that an entire photomask for the circuit 10 may be formed within each of the areas. Although it will be appreciated that the basic patterns 50*a*–50*i* may be placed in any relative position so long as they are rigidly interconnected, in accordance with one specific aspect of the invention the respective patterns 50*a*–50*i* are positioned in corresponding corners and relative positions within the respective photomask areas A–I. However, the position of the respective basic patterns 50*a*–50*i* need not be accomplished with any particular degree of accuracy in so far as translation along the X and Y-axes is concerned, so long as the spacing between each exceeds the space required for each photomask. However, the rotational relationship of the nine basic patterns should be accurately controlled. This can be accomplished either by initially creating the nine basic patterns on a single artwork sheet, or by careful orientation when the patterns are transferred to a single reticle. The transparent plate 60 with the nine basic opaque patterns 50*a*–50*i*** thereon then constitutes a first reticle from which a photographic plate is to be exposed as will presently be described.

Figure 5:
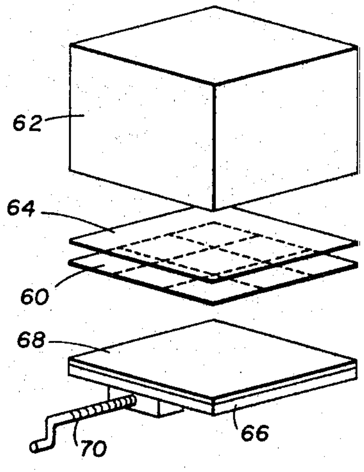
FIGURE 5 is a schematic representation of a mechanism which may be used in carrying out the process of the present invention.

A suitable system for carrying out the present invention is illustrated schematically in FIGURE 5 and may comprise a means for holding the reticle 60 in fixed relation to a suitable light source 62. As described herein, the reticle 60 is the same size as the photographic plate 68 which is to be exposed and a suitable light source is utilized. However, it will be appreciated that a magnifying or reducing photographic system can be utilized to produce either an enlarged or reduced image of the reticle. A set of opaque masks is also provided for masking out all but selected component areas of the several basic patterns **50*a*–50*i* in sequences hereafter described in detail. This set of masks is indicated schematically at 64. A carriage 66 is provided for supporting the photographic plate 68 so that the plate will be exposed by the image resulting from the light eminating from the source 62 and passing through the mask 64 and the reticle 60. The carriage 66 need be mounted for movement in only one direction and can be moved a predetermined distance with considerable accuracy by means of a suitable mechanism represented by the screw 70. An important advantage of this invention is that the carriage 66** and mechanism for indexing the carriage can be relatively inexpensive because great precision in movement of the carriage is not required as will hereafter be pointed out in greater detail.

Figure 6:
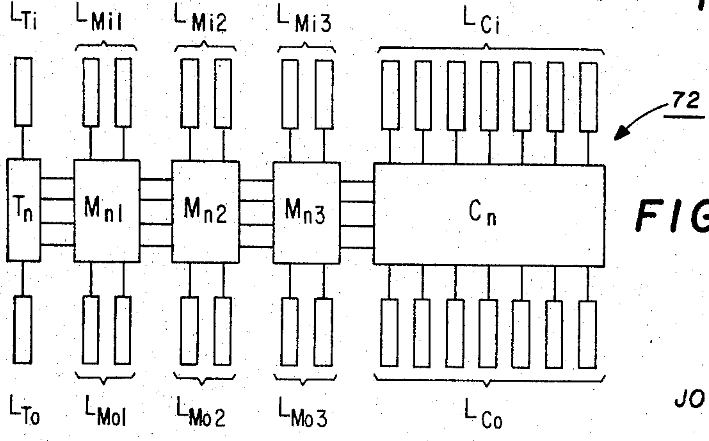
FIGURE 6 is a schematic illustration of an intermediate pattern produced in the process of the present invention.

The reticle 60 is then placed in position in the apparatus represented by FIGURE 5 and a photographic plate 68 positioned on the carriage 66. The reticle 60 is positioned such that operation of the screw 70 will move the plate 68 from right to left in FIGURE 4. The photographic plate 68 is first placed substantially in register with the reticle 60. The component areas $L_{Ci}$, $C_n$ and $L_{Co}$ of each of the basic patterns **50*a*–50*i* are masked so that only the component areas $L_{Ti}$, $L_{Mi}$, $T_n$, $M_n$, $L_{To}$ and $L_{Mo}$ will be exposed on the respective areas of the plate 68. The light source 62 is then energized for a predetermined time interval to expose the areas $L_{Ti}$, $L_{Mi1}$, $T_n$, $M_{n1}$, $L_{To}$ and $L_{Mo1}$ illustrated in FIGURE 6 for each of the areas A–I. Then the plate 68 is moved to the left (referring to FIGURE 4) a distance such that the component areas $L_{Mi}$, $M_n$ and $L_{Mo}$ are aligned in positions corresponding to component areas $L_{Mi2}$, $M_{n2}$ and $L_{Mo2}$ of the area illustrated in FIGURE 6 and all other component areas are masked. The plate 68 is then repeat-exposed to produce the areas $L_{Mi2}$, $M_{n2}$ and $L_{Mo2}$. The plate 68 is then stepped until the component areas $L_{Mi}$, $M_n$ and $L_{Mo}$ register with the areas $L_{Mi3}$, $M_{n3}$ and $L_{Mo3}$. Since this is the last repetitive vertical component area transversely of the circuit 50, only component areas $L_{Ti}$, $T_n$ and $L_{To}$ are masked so that the areas $L_{Mi3}$, $L_{Ci}$, $M_{n3}$, $C_n$, $L_{Mo3}$ and $L_{Co}$ are all exposed simultaneously to complete the intermediate pattern 72. The photo plate is then developed and printed to form a second reticle 80 as illustrated in FIGURE 6. It will be noted that the intermediate patterns $72a$ in each of the photomask areas A–I, respectively, of the reticle 80 now include all components in the transverse direction of the circuit 10 with all repetitive component areas in the longitudinal direction omitted as best illustrated in the representative pattern 82** of FIGURE 6.

Figure 8:
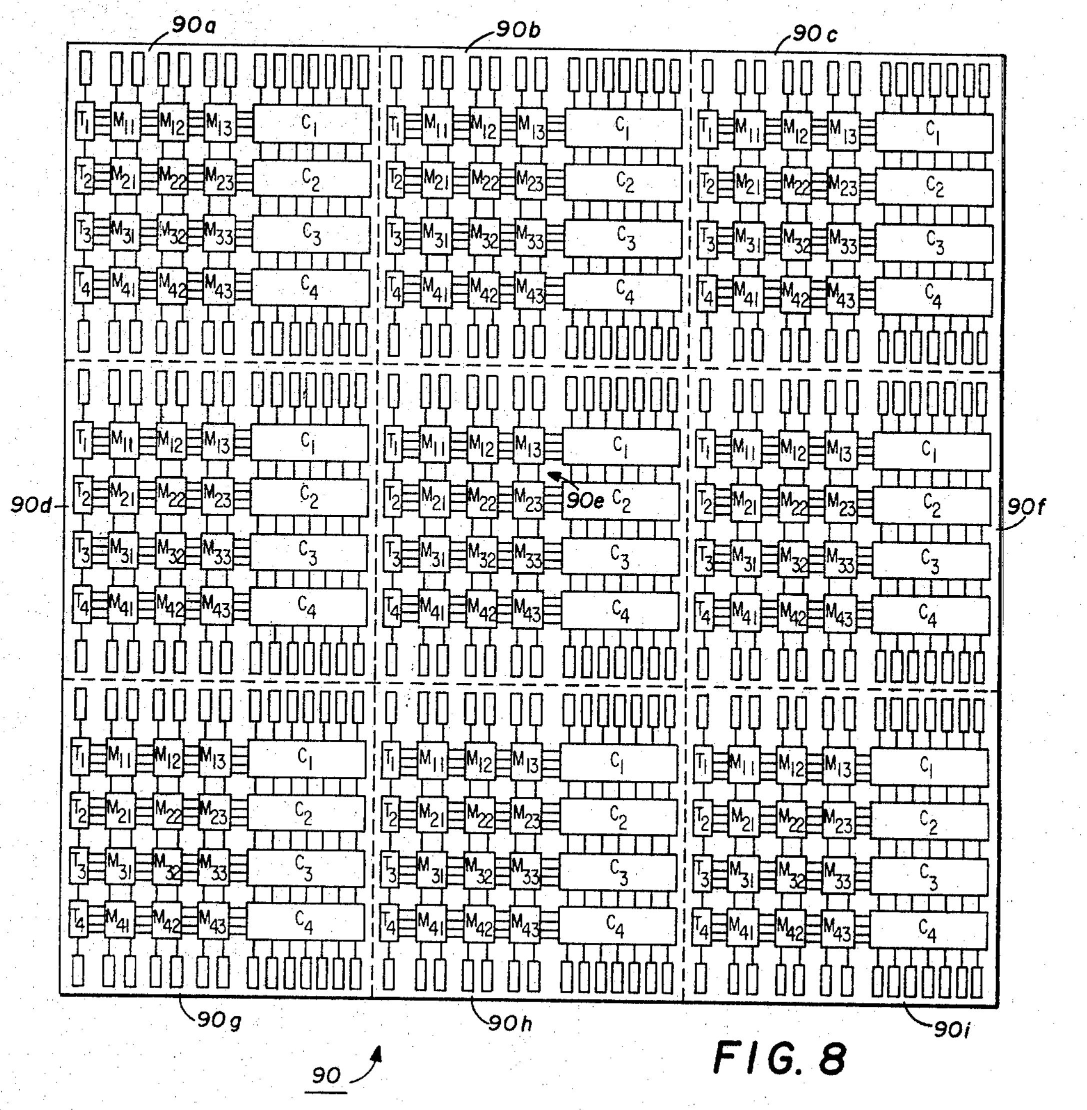
FIGURE 8 is a schematic representation of the final set of photomasks produced in acocrdance with the process of the present invention.

The second recticle 80 is then disposed at position 60 as illustrated in the system of FIGURE 5, but is oriented such that operation of the screw 70 will move a second photographic plate positioned on the carriage 66 from the bottom toward the top of FIGURE 6. The second photographic plate is then moved substantially into register with the reticle 80 with the intermediate patterns 72*a*–72*i* positioned over the upper edges of the respective areas A–I. The component areas $L_{To}$, $L_{Mo1}$–$L_{Mo3}$ and $L_{Co}$ are masked off by the mask off by the mask 64, and the remaining component areas of each of the intermediate patterns 72*a*–72*i* exposed onto the photographic pate to form the areas $L_{Ti}$, $L_{Mi1}$–$L_{Mi3}$, $L_{Ci}$, $T_1$, $M_{11}$–$M_{13}$, and $C_1$ of each area A–I. Then the plate 90 is moved upwardly relative to the reticle 80 and the entire word $W_2$ including the component areas $T_2$ and $C_2$ and all of the memory cell areas $M_{21}$–$M_{23}$ is simultaneously exposed while masking off both the input terminal areas $L_i$ and $L_o$. The photographic plate 90 is then successively stepped upward and the successive words $W_3$ and $W_4$ exposed. When the last word $W_4$ is exposed, the output terminal areas $L_{To}$, $L_{Mo1}$–$L_{Mo3}$, and $L_{Co}$ are also exposed. When the photographic plate is developed, the nine photomasks 90*a*–90*i* illustrated in FIGURE 8 are complete and may be reproduced and divided as required for subsequent use in the conventional manner.

Thus it will be noted that the component areas of each of the photomasks 90*a*–90*i* are in the same precise relative relationship as the relationship between corresponding component areas of the other photomasks. For example, the component area $M_{11}$ of photomask 90*a* is in the precise same relationship to component area $M_{33}$ of photomask 90*a* as component area $M_{11}$ of photomask 90*i* is to component area $M_{33}$ of photomask 90*i*, and the same relative relationship exists between the component areas $M_{11}$ and $M_{33}$ of all the other photomasks because all corresponding component areas of all the photomasks 90*a*–90*i* were exposed after the same mechanical stepping movements of the photographic plates relative to the reticles. Thus, the several photomasks may be successively aligned during the process and all component areas of all the masks will precisely register. All errors in positioning the component areas for exposure at the successive positions are precisely duplicated in each of the photomasks. The positioning errors result only in misalignment of interconnecting strip-line conductors between adjacent and successively exposed component areas, and these strip-line conductors may be purposely enlarged in the basic patterns 50*a*–50*i* so that relatively large errors in positioning the first reticle 60 carrying the basic patterns 50*a*–50*i* will not result in strip-line conductors less than a minimum width. Thus, not only is the registration accuracy of the set of photomasks improved beyond that capable with any existing stepping equipment, the complexity and accuracy of the required equipment is significantly reduced by orders of magnitude over that which would be otherwise required.

Although a preferred embodiment of the invention has been described in detail, it is to be understood that various changes, substitutions and alterations can be made therein without departing from the spirit and scope of the invention as defined by the appended claim.

What is claimed is:

1. The process for producing a set of photomasks for fabricating a multilayer circuit having a high population density of a plurality of component areas, at least one of which is repeated, disposed at predetermined relative positions within the circuit which comprises:

producing a basic pattern for each photomask, each basic pattern including all the different component areas in the circuit, the different component areas being oriented in order of occurence in the circuit in both the transverse and longitudinal directions with all repetitive component areas in both said directions omitted, producing a first reticle including each of the basic patterns, the basic patterns being rigidly interconnected at spaced positions, moving a first photographic plate relative to the first reticle in the transverse direction to successively align each component area with the appropriate relative position on the first photographic plate, exposing the photographic plate through the appropriate component areas of each basic pattern at each of the successive transverse positions, developing the first photographic plate to produce a second reticle having an intermediate pattern for each photomask at rigidly interconnected, spaced positions, each intermediate pattern including all component areas of the circuit in the transverse direction and eliminating all repetitive component areas in the longitudinal direction, moving a second photographic plate relative to the second reticle in the longitudinal direction to successively align each transverse set of component areas of the intermediate patterns with the appropriate relative longitudinal position on the second photographic plate, exposing the second photographic plate through the appropriate component areas of each of the intermediate patterns at each of the successive longitudinal positions, and developing the second photographic plate to produce the set of photomasks whereby corresponding component areas of all the photomasks will have corresponding positional areas and will be precisely registrable.

References Cited

UNITED STATES PATENTS

| | | | |
|---|---|---|---|
| 3,245,794 | 4/1966 | Conley | 96—44 |
| 761,945 | 6/1904 | Cherrill | 96—30 XR |
| 3,320,657 | 5/1967 | Strobel | 29—155.5 |

GEORGE F. LESMES, Primary Examiner

R. E. MARTIN, Assistant Examiner

U.S. Cl. X.R.

96—36.2, 38.2, 38.3

UNITED STATES PATENT OFFICE

CERTIFICATE OF CORRECTION

Patent No. 3,477,848 November 11, 1969

John P. Pritchard, Jr.

It is certified that error appears in the above identified patent and that said Letters Patent are hereby corrected as shown below:

Column 8, line 49, "areas" should read -- errors --.

Signed and sealed this 27th day of October 1970.

(SEAL)
Attest:

Edward M. Fletcher, Jr.
Attesting Officer

WILLIAM E. SCHUYLER, JR.
Commissioner of Patents